United States Patent
Peden, II et al.

(10) Patent No.: US 8,339,244 B2
(45) Date of Patent: Dec. 25, 2012

(54) ASSET TAG POWER OPTIMIZATION

(75) Inventors: Jeffrey J. Peden, II, Burlington, MA (US); Christopher J. Leonardo, Waltham, MA (US); Christopher Cacioppo, Somerville, MA (US)

(73) Assignee: Trapeze Networks, Inc., Pleasanton, CA (US)

( * ) Notice: Subject to any disclaimer, the term of this patent is extended or adjusted under 35 U.S.C. 154(b) by 437 days.

(21) Appl. No.: 12/511,041

(22) Filed: Jul. 28, 2009

(65) Prior Publication Data

US 2010/0315203 A1    Dec. 16, 2010

Related U.S. Application Data

(60) Provisional application No. 61/187,255, filed on Jun. 15, 2009, provisional application No. 61/227,405, filed on Jul. 21, 2009.

(51) Int. Cl.
*H04Q 5/22* (2006.01)

(52) U.S. Cl. ............ 340/10.1; 340/3.51; 340/5.61; 340/5.62; 340/5.63; 340/7.21; 340/10.32; 340/505; 340/572.2; 705/1.1; 705/28; 235/375; 235/385

(58) Field of Classification Search ........ 340/10.32, 340/572.2, 10.1–10.6, 1.1, 3.51, 5.6–5.67, 340/7.21–7.23, 572.1–572.9, 505; 705/28, 705/1.1, 7.11–7.42; 235/385, 375

See application file for complete search history.

(56) References Cited

U.S. PATENT DOCUMENTS

| | | |
|---|---|---|
| 6,353,406 B1 | 3/2002 | Lanzl et al. |
| 2006/0114109 A1 | 6/2006 | Geissler |
| 2007/0046432 A1* | 3/2007 | Aiouaz et al. ............. 340/10.1 |
| 2007/0109129 A1* | 5/2007 | Sundstrom et al. ........ 340/572.2 |
| 2007/0118309 A1 | 5/2007 | Stewart |
| 2007/0139199 A1 | 6/2007 | Hanlon |
| 2007/0236331 A1* | 10/2007 | Thompson et al. ......... 340/10.1 |
| 2007/0236335 A1* | 10/2007 | Aiouaz et al. ............ 340/10.32 |
| 2007/0247366 A1 | 10/2007 | Smith et al. |
| 2008/0041930 A1 | 2/2008 | Smith et al. |
| 2008/0100442 A1 | 5/2008 | Grunwald et al. |
| 2008/0125102 A1 | 5/2008 | Abel et al. |
| 2008/0195509 A1* | 8/2008 | Bellacicco et al. .......... 705/28 |
| 2008/0197978 A1* | 8/2008 | Diorio et al. ............. 340/10.1 |
| 2008/0197979 A1* | 8/2008 | Enyedy et al. ............ 340/10.1 |

OTHER PUBLICATIONS

International Search Report PCT/US2010/38390 dated Oct. 25, 2010; pp. 1-3.
Written Opinion PCT/US2010/38390 dated Oct. 25, 2010; pp. 1-5.

* cited by examiner

*Primary Examiner* — George Bugg
*Assistant Examiner* — Sisay Yacob

(57) ABSTRACT

A technique for saving power in a tag that is operationally connected to an asset involves using telemetry data to enter an appropriate power state. An asset tracking system according to the technique can make use of context to better track assets to which power-saving tags are operationally connected. Secure tag configuration techniques and asset-agnostic tags are described. Location-agnostic tags are also described.

20 Claims, 7 Drawing Sheets

ASSET TAG POWER OPTIMIZATION

CROSS-REFERENCED TO RELATED APPLICATIONS

This application claims priority to U.S. Provisional Application No. 61/187,255, filed Jun. 15, 2009, entitled Reducing Calibration Requirements for a Position Detection Engine and U.S. Provisional Application No. 60/227,405, filed Jul. 21, 2009, entitled Asset Tagging which are hereby incorporated by reference in their entirety.

BACKGROUND

Asset-tracking systems are used in various enterprises, such as hospitals, to track various assets, such as computers on wheels (COWs). Some systems use wireless tags that are connected to assets to help track the location of the asset. Installing the infrastructure to enable asset tracking is normally relatively expensive. For example, a hospital might pay on the order of $150,000 to implement an asset tracking system.

A tag typically has sufficient power to operate for about 6 months before its batteries are dead. The relatively short lifespan is due to several factors. One factor is that the tags are location-aware, which means they receive signals from infrastructure that are associated with particular locations, and the tags then have to report the location data back to an asset tracking system. The tags also normally use a two-way protocol, which includes sending a frame and receiving an acknowledgement of receipt.

It is desirable to reduce the power consumption of asset tags to increase lifespan, which is an ongoing area of research. It is desirable to reduce costs associated with implementing an asset-tracking solution, which is an ongoing area of research. It is generally desirable to keep data associated with assets secure, and to obtain the most accurate estimates of location given the parameters of the solution.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for saving power in a tag that is operationally connected to an asset involves using telemetry data to enter an appropriate power state. An asset tracking system according to the technique can make use of context to better track assets to which power-saving tags are operationally connected. Secure tag configuration techniques and asset-agnostic tags are described. Location-agnostic tags are also described.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
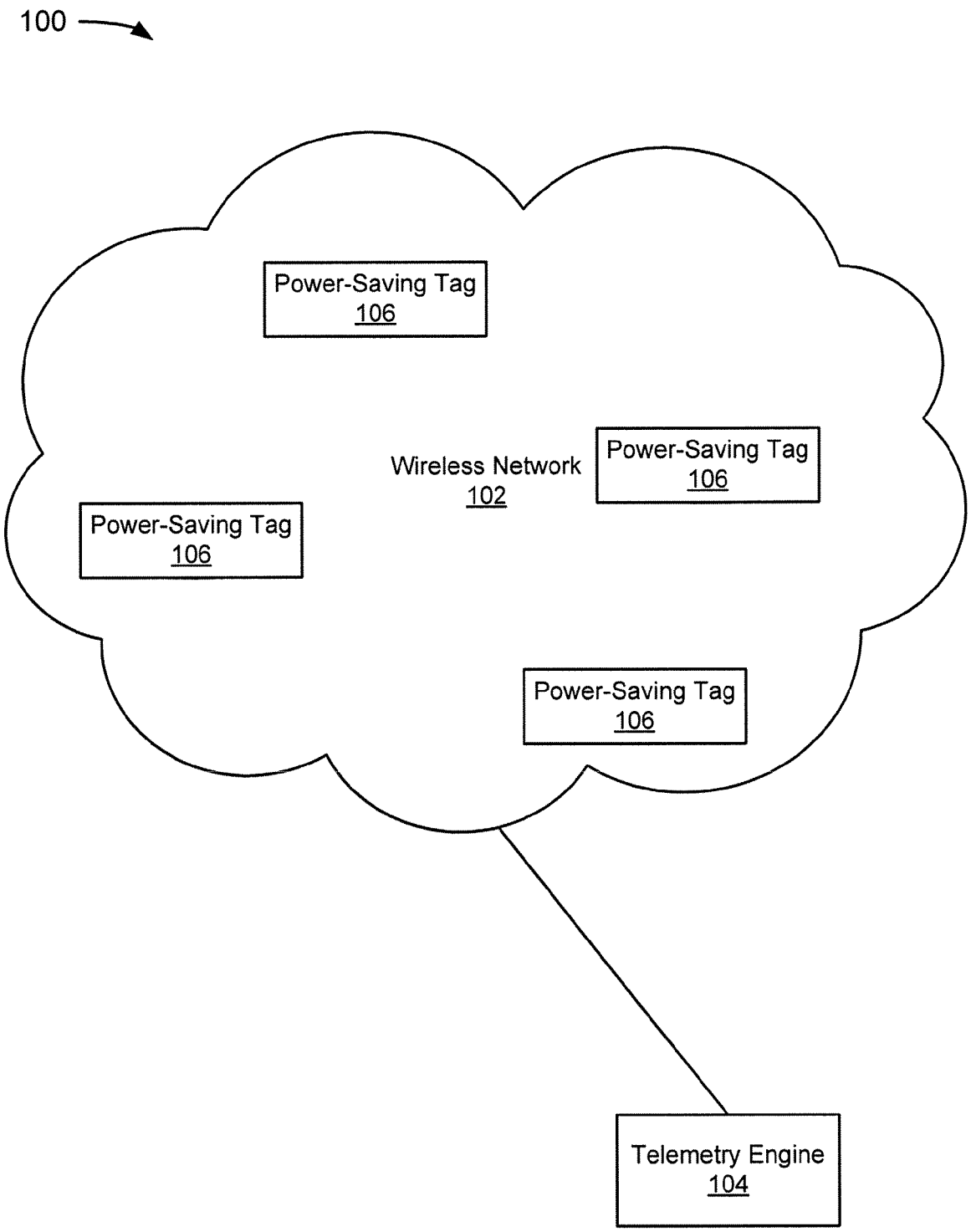
FIG. 1 depicts an example of an asset tag power optimization system.

FIG. 1 depicts an example of an asset tag power optimization system 100. The system 100 includes a wireless network 102, a telemetry engine 104, and one or more power-saving tags 106.

It may or may not be desirable to distinguish between components that are on the wireless network 102; components that are associated with the wireless network 102; and components that are neither on nor truly associated with the wireless network 102, but are nearby, interfering, or otherwise not quite associated with the wireless network 102 (e.g., operating within range of an access point (AP) of the wireless network 102, if applicable, but not on the wireless network 102). For example, a station that is connected to the wireless network 102 through an AP can be referred to as on the wireless network 102. A controller wire-coupled to an AP of the wireless network 102 or a station that is connected to a local area network (LAN) with which the wireless network 102 is associated, such as through virtual LAN (VLAN) tunneling, might not be referred to as not on the wireless network 102, but nevertheless would be associated with the wireless network 102. A station that is not connected through an AP of the wireless network 102, but is sending or receiving radio frequency (RF) signals within range of the AP, might be referred to as operating within the wireless domain associated with the wireless network 102, but would typically not be referred to as on the wireless network 102.

In the example of FIG. 1, the wireless network 102 can include a plurality of wireless transmit and/or receive nodes. A node will be referred to as an AP in this paper, though it should be recognized that terminology will vary depending upon the technology and/or implementation. For example, in an ad-hoc network the term "AP" is typically not used. For the sake of illustrative simplicity, since a person of skill in the relevant art will have no trouble in finding the relevant teen in the Institute of Electrical and Electronic Engineers (IEEE) 802.11 standard, the current version of which is incorporated by reference, terms that are typically used in the 802.11 standard will be preferentially used in this paper when discussing wireless technology. It should be understood that different terminology may be used when referring to other wireless technology.

A station, as used herein, may be referred to as a device with a media access control (MAC) address and a physical layer (PHY) interface to the wireless medium that comply with the IEEE 802.11 standard. Since APs that comply with the 802.11 standard have these characteristics, an AP can be referred to as a station. Where it is desirable to draw a distinction between an AP and a non-AP station, the AP can be referred to as an "AP" and a station can be referred to as a "non-AP station." In general, a station can comply with any wireless standard or none at all, and may have any known or convenient interface to a wireless or other medium, though depending upon the standard, a station may be referred to as something other than a "station," and may have different interfaces to a wireless or other medium. Exhaustively listing every implementation of a station is difficult, but some examples include a laptop, a wireless telephone, portable digital assistant (PDA), a desktop computer, or any other applicable computing device capable of communication on a wireless network.

Depending upon the technology or implementation, an AP includes a hardware unit that acts as a communication hub by linking wireless mobile stations to a wired backbone network. This can, for example, enable APs to connect users to other users within the network and/or to serve as the point of interconnection between a wireless local area network (WLAN) and a fixed wire network. The number of APs that are desirable for a given implementation can depend upon the desired size of a wireless domain. For example, it may be desirable to locate the APs such that they cover the entire area/space of a wireless domain. The number of APs that are desirable for a given implementation can also depend upon whether data from the APs is used to get a snapshot of where stations, or a subset of the stations, are located within the wireless network; generally, the more APs, the better, though at some point there is likely to be diminishing returns. An implementation of an AP, provided by way of example but not limitation, includes a TRAPEZE NETWORKS® MOBILITY POINT® (MP®) AP. An implementation of a wireless domain, provided by way of example but not limitation, includes a TRAPEZE NETWORKS® SMART MOBILE® (TRAPEZE SMART MOBILE®) wireless domain.

In operation, an AP can typically transmit and receive data (and may therefore be referred to as a transceiver) using one or more radio transmitters. For example, an AP can have two associated radios, one which is configured for 5 GHz transmissions, and the other which is configured for 2.4 GHz transmissions. (Other bands are acceptable, too.) In a non-limiting embodiment, APs transmit and receive information as radio frequency (RF) signals to and from a wireless station over an Ethernet connection. APs can transmit and receive information to and from their associated wireless exchange switches. Connection to a second wireless exchange switch provides redundancy. An implementation of a wireless exchange switch, provided by way of example but not limitation, includes a TRAPEZE NETWORKS® MOBILITY EXCHANGE® (MX®) switch.

In the example of FIG. 1, the wireless network 102 is connected to the telemetry engine 104. Although the telemetry engine 104 is depicted as "outside" of the wireless network 102, it could be implemented as or logically considered part of the wireless network 102. For example, the telemetry engine 104 could be a station on the wireless network 102 or coupled to the APs of the wireless network 102 through a wired backbone.

As used in this paper, an engine includes a processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Telemetry data can include data obtained from sensors on the power-saving tags 106. In this case, the quality and type of telemetry data will depend upon the quality and type of sensors. Advantageously, telemetry-dependent power optimization can be accomplished using techniques described in this paper. A novel implementation, described in this paper, that facilitates deployment of the power-saving tags 106 within, for example, an existing WiFi network without additional infrastructure investment can include sensors implemented on the power-saving tags 106 themselves.

In the example of FIG. 1, the power-saving tags 106 are within the wireless network 102. Depending upon the configuration of the power-saving tags 106, which need not be the same for each of the power-saving tags 106, the power-saving tags 106 can be capable of associating with a number of different networks. For example, the power-saving tags 106 might include a passive RFID device as well as an 802.11-compliant radio. Thus, where the wireless network 102 is an 802.11-compliant WLAN, the power-saving tags 106 could be thought of as being a part of both the wireless network 102 and an RFID network (or a cellular network, or a GPS network, etc.). The power-saving tags 106 can also associate through the wireless network 102 with another network via, by way of example but not limitation, VLAN tunneling.

In the example of FIG. 1, the wireless network 102 operates in accordance with any applicable known or convenient wireless standard, or no standard at all. It should be noted that certain novel embodiments necessarily restrict the standard that can be used because the novel embodiments might, for example, facilitate implementation of an asset tagging system on existing infrastructure, rather than by adding additional infrastructure. In this example, it follows that the wireless network 102 would not include the additional infrastructure, since that would defeat the purpose of the novel embodiment.

In the example of FIG. 1, in operation, the telemetry engine 104 receives telemetry data from the wireless network 102. The power-saving tags 106 can acquire telemetry data using sensors. Telemetry data can include any applicable known or convenient data, which will vary depending upon the quality and type of sensors at the power-saving tags 106. The telemetry data can be received in a raw format, such as in the form of sensor readings. Alternatively, the power-saving tags 106 or other station can perform some pre-processing on the data and provide a report. If processing of raw data is performed after the data is forwarded from a wireless node, such as an AP, then the engine performing the processing is considered, for illustrative simplicity, to be logically part of the telemetry engine 104.

In the example of FIG. 1, in operation, the telemetry engine 104 considers the telemetry data and determines an optimal power state for the power-saving tag 106. For example, if it is determined that the asset tag has just started moving (using, e.g., a motion sensor) the asset tag might be set to a high power state for a time and when the asset tag comes to rest, the asset tag might be set to a high power state for a time; when the asset tag does not have a change in motion, it can be set to an idle state, possibly with an occasional wake-up to send telemetry data.

In an alternative embodiment, a portion of the telemetry engine 104 could be implemented in the various power-saving tags 106. This would enable the asset tags 106 to at least in part self-optimize for power. However, a specific embodiment includes asset tracking, and at least some telemetry data reporting will likely be useful. An advantage of a centralized asset tracking system according to the techniques described in this paper is that the tag need not include any information about the asset, and the information about the asset can be maintained in a secure and/or convenient data store.

Figure 2:
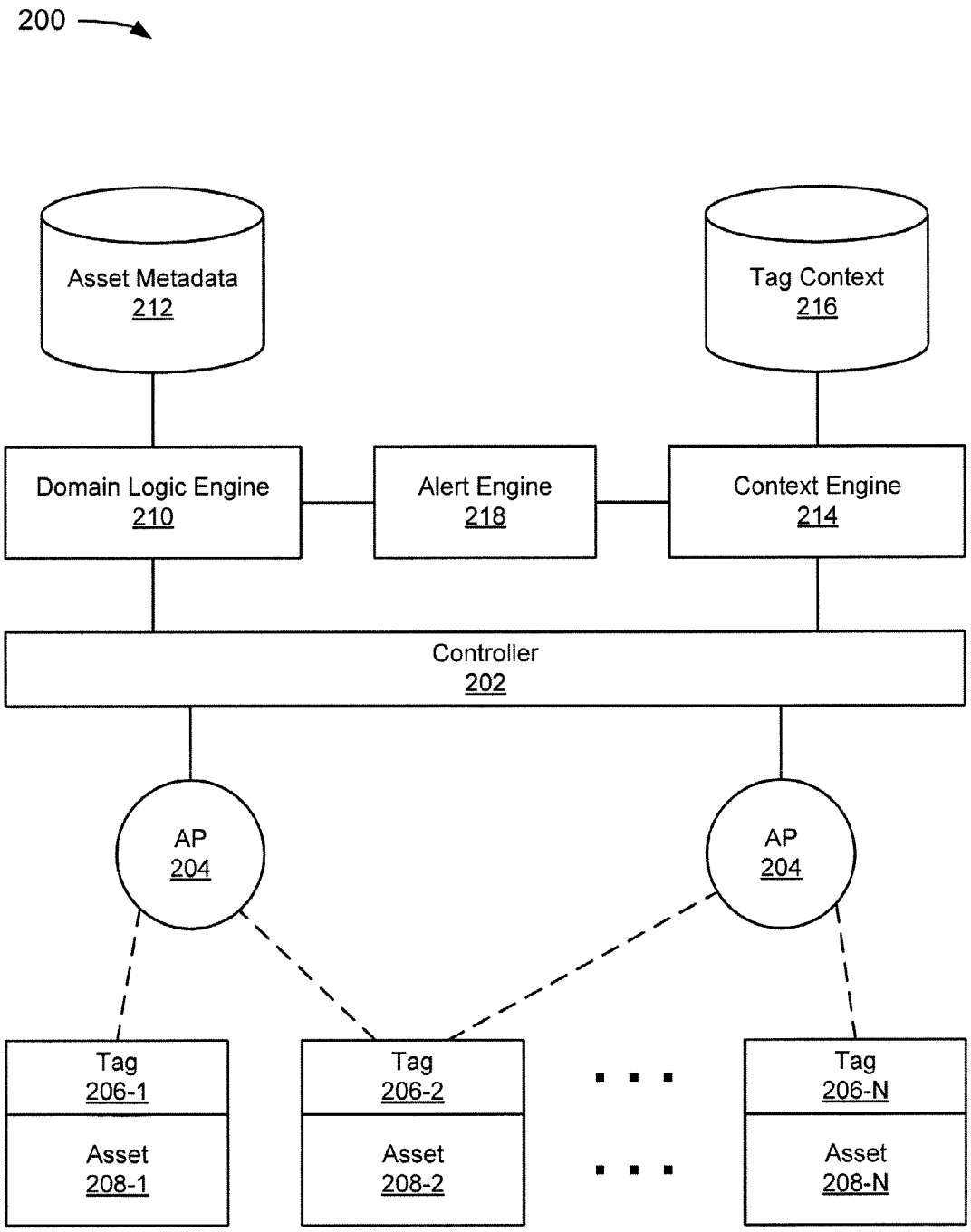
FIG. 2 depicts an example of an asset tracking system.

FIG. 2 depicts an example of an asset tracking system 200. The system 200 includes a controller 202, one or more APs 204, tags 206-1 to 206-N (collectively referred to as tags 206), assets 208-1 to 208-N (collectively referred to as assets 208), a domain logic engine 210, an asset metadata data store 212, a context engine 214, a tag context data store 216, and an alert engine 218.

In the example of FIG. 2, the controller 202 includes an engine that is implemented in special purpose hardware, firmware, or software embodied in a computer readable medium for execution by a processor. The controller 202 can include practically any type of device that is capable of communicating with a communications network, such as, by way of example but not limitation, a server class computing system or a workstation. In a non-limiting embodiment, the controller 202 includes a wireless exchange switch. In another non-limiting embodiment, a wireless exchange switch includes the controller 202. The controller 202 can be distributed or centrally located. In a non-limiting example, the controller 202 is connected to a wireless backbone network, either directly or indirectly through a wireless network. Although the controller 202 is depicted in the example of FIG. 1 as a distinct block, the controller 202 can actually include multiple separate controllers and/or switches. For example, the controller 202 can include a single controller for all of the APs 204; multiple controllers, one for each of the APs 204; or some arbitrary or convenient number of controllers, each for controlling a subset of the APs 204. In some implementations, the controller 202 controls a "dumb" AP, while in other implementations, functionality of the controller 202 can be implemented in whole or in part in a "smart" AP. If the APs 204 are sufficiently smart, all of the controller 202 could potentially be put into the APs 204. The controller 202 is typically aware of the associations of stations to all of the APs 204.

In the example of FIG. 2, the APs 204 are coupled to the controller 202 with a solid line, which is intended to depict a connection that is at least in part a wired connection. Although in at least some implementations the controller 202 and the APs 204 will be wire-connected, this is not, strictly speaking, a critical requirement.

In the example of FIG. 2, the APs 204 are coupled to the tags 206 with a dashed line, which is intended to depict a connection that is at least in part a wireless connection. It should be noted that although the tags 206 are depicted as wirelessly connected to the APs 204, which are wire-connected to the controller 202, it is possible to have untethered APs (UAPs) that are wirelessly connected to other APs. Similarly, an ad-hoc network might have multiple wireless hops between a tag and a wired connection.

It should be noted that the tags 206 will typically connect to the wireless network associated with the APs 204 through one of the APs 204. However, the dashed line from the tag 206-2 to both of the depicted APs 204 is intended to illustrate that the APs 204 can hear the tags 206 if the tags 206 are within range, regardless of whether the tags 206 are connected to the network through any particular AP. This can improve pattern matching to estimate the location of a tag.

In the example of FIG. 2, the tags 206 are respectively operationally connected to the assets 208. Although there are some practical limits on what an asset might be, which will vary depending upon the technology and implementation, almost any composition of matter, whether living or non-living, can be tagged. Thus, although in some implementations tagged assets might simply include devices, such as laptops, crash carts, etc., in other implementations tagged assets can include animals (including human beings), plants, minerals, etc. The manner in which the tags 206 are operationally connected to the assets 208 can be implementation-specific, but it defeats the purpose of tracking the asset if the operational connection enables the asset and the tag to be inconveniently separated. Thus, in this paper, it is assumed that a tag that is operationally connected to an asset will result in the tag and the asset being substantially co-located.

In the example of FIG. 2, the domain logic engine 210 is coupled to the tags 206 through the controller 202 and APs 204. In another embodiment, the tags 206 could conceivably be coupled to the domain logic engine 210 through some other route (e.g., a cellular telephone connection). However, for illustrative simplicity, it is assumed in this paper that the tags 206 are coupled to the domain logic engine 210 through the controller 202 and the APs 204.

In the example of FIG. 2, the domain logic engine 210 is coupled to the asset metadata data store 212. The asset metadata data store 212 can be of practically any size; the number of tags that can be tracked is more likely to be wireless resource-constrained than data storage-constrained. The asset metadata includes data about the individual assets 208, such as what type of asset, operational parameters, etc. Advantageously, the tags 206 need not include data about the assets 208 to which they are operationally connected. In a specific implementation, the tags 206 never include data about the assets 208, and the data is kept in a secure data store (the asset metadata data store 212).

Since the domain logic engine 210 is coupled to the asset metadata data store 212, the domain logic engine 210 is aware of what tag is operationally connected to which asset. Depending upon the embodiment and/or implementation the domain logic engine 210 may be capable of configuring tags based on the type of asset to which the tag is operationally connected, activity associated with the asset, and/or the location of the asset. The ability of the domain logic engine 210 to configure tags based upon context (i.e., both telemetry and location) is one of the advantages of implementing techniques described in this paper. In an embodiment, the domain logic engine 210 can generate tag reports or asset reports. An implementation of a domain logic engine, provided by way of example but not limitation, includes a Newbury Networks ACTIVE ASSET® software solution.

In the example of FIG. 2, the context engine 214 is coupled to the tags 206 through the controller 202 and APs 204. In another embodiment, the tags 206 could conceivably be coupled to the context engine 214 through some other route (e.g., a cellular telephone connection). However, for illustrative simplicity, it is assumed in this paper that the tags 206 are coupled to the context engine 214 through the controller 202 and the APs 204.

Context, as used in this paper, is intended to include location and telemetry data. Location can be gathered using one or more techniques, such as pattern matching (see, e.g., U.S. Pat. No. 6,674,403, which is incorporated by reference), triangulation (see, e.g., U.S. Patent Publication US2007/0086378, which is incorporated by reference), radio signal transmission delay (see, e.g., U.S. application Ser. No. 11/944,346, which is incorporated by reference), or some other known or convenient technique. Using techniques described in this paper, the context engine 214 can use telemetry data to improve one or more of the techniques, such as by more reliably predicting results of pattern matching. Advantageously, by using context (i.e., telemetry and location data), the context engine 214 can more reliably estimate tag location than when using location data alone, and may be able to more effectively optimize power consumption at a tag using location data in conjunction with telemetry data.

In the example of FIG. 2, the context engine 214 is coupled to the tag context data store 216. The tag context includes data associated with the tags 206, such as operational state, sensor readings, etc. Advantageously, although the tags 206 may be aware of telemetry readings, the tags 206 need not be aware of their actual location. In a specific implementation, the tags are WiFi location-agnostic. This is advantageous because the tags 206 can be tracked without the need to provide infrastructure, which is typically expensive, to teach the tags 206 their locations. Moreover, it is unnecessary to waste bandwidth sending the tags 206 their location when the context engine 214 estimates location for the tags 206 because the tags 206 do not need to know if techniques described in this paper are employed.

In the example of FIG. 2, the alert engine 218 is coupled to the domain logic engine 210 and the context engine 214. When the context engine 214 determines that parameters associated with the tag merit an alert, the alert engine 218 triggers an alert to the domain logic engine 210. The domain logic engine 210 can triage the situation, inform an agent of the problem, and/or resolve the alert in an appropriate manner.

In the example of FIG. 2, in operation, the asset metadata data store 212 includes data associated with the assets 208. The method by which the data is input into the data store is not critical, though there are specific implementations that make certain data entry techniques more effective. Likely methods include manual data entry by an administrator, downloading data from a data source, automatic assignment of certain field values (e.g., randomly generated tracking numbers), and the like, and/or a combination of the various data entry methods. In a specific embodiment in which it is desirable to keep the tags asset-agnostic, data entry for each asset is required. This is because there must be some way to associate a tag with the asset and, due to the implementation-specific design parameters, the association must be through a data store that is not in the tag itself. Thus, as used in this paper, asset-agnostic tags are those that do not include any data that allows the tag to be directly associated with the asset to which it is operationally connected, without access to an asset-tracking system or emote (with respect to the tag) data store. It should be noted that an asset-agnostic tag will not even include encrypted data that identifies the asset to which the tag is operationally connected.

After (or at the same time) the asset metadata data store has data for an asset, a tag can be operationally connected to the asset. In a specific embodiment in which the tag is asset-agnostic, the asset is operationally connected to an asset-agnostic tag. This refers to a physical asset-to-tag coupling. In this embodiment, it may also be desirable to logically couple the asset and the asset-agnostic tag. To this end, the asset-agnostic tag is configured in association with the asset. An example of such a configuration is recording the MAC address, or some other identifying data, of the asset-agnostic tag in the asset metadata data store 212 in a field of a record associated with the asset.

In a specific embodiment, configuring a tag in association with an asset may be controlled in some manner to prevent reconfiguring the tag in appropriately. This can be accomplished by restricting configuration to a specific location, to a person who knows a password, or in some other manner. For example, in a hospital, it may be desirable to tag a crash cart. To configure a tag in association with a crash cart, a requirement could be to press a button on the tag while in a nurse's station (e.g., using some form of proximity-detecting technology to determine the tag is in the nurse's station).

Figure 3:
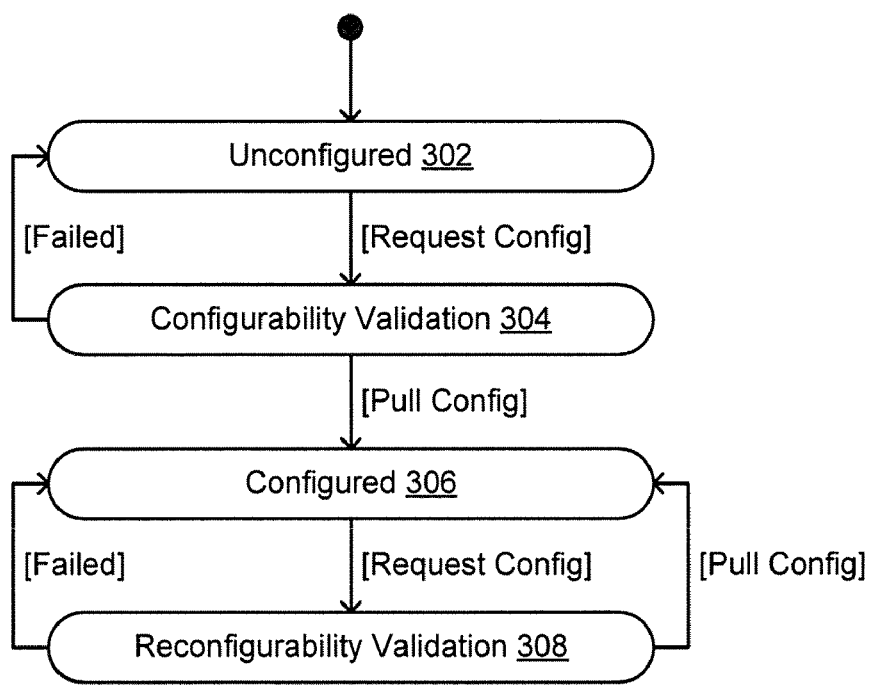
FIG. 3 depicts an example of a state diagram for a tag that is initially unconfigured.

FIG. 3 depicts an example of a state diagram 300 for a tag that is initially unconfigured. In the example of FIG. 3, the state diagram 300 starts at unconfigured state 302. It should be noted that "unconfigured" could be considered just another configuration state. However, in the example of FIG. 3, it is assumed that behavior is different when unconfigured (e.g., an unconfigured tag might be unable to wake up and transmit without first being turned on, while a configured tag might chirp from time to time).

In the example of FIG. 3, the state changes to configurability validation state 304 when there is a request for configuration. The request for configuration can take the form of, by way of example but not limitation, a human pressing a button on the tag.

If the configurability validation fails, then the state returns to unconfigured state 302. The configurability validation can fail if, by way of example but not limitation, the tag is in a location in which configuration is not allowed (e.g., a tag in a hospital might only be configurable at the nurse's station). The configurability validation, depending upon the implementation and/or embodiment, may also fail for some other reason, such as if there is no asset that is ready for association with a tag.

When configuration is requested, a management engine must be aware that configuration is being attempted for a specific asset. This can be accomplished by, for example, flagging an asset in an asset database as ready for tagging. Then, when the tag pulls a configuration from a configuration server, the configuration can be associated with the asset that was flagged. One way to associate an asset with a tag is to assign the MAC address of a tag to the asset in an asset metadata data store. That way, when data associated with the MAC address is received, the data can be associated with the asset by checking the asset metadata data store.

If, on the other hand, the configurability validation succeeds the tag pulls configuration information from a configuration server and the state changes to configured 306. Having the tag pull a configuration from a configuration server is one possible implementation. It may also be possible to push the configuration to the tag. However, some techniques for requesting configuration (e.g., by pressing a button on the tag) make pulling a more straight-forward mechanism for obtaining configuration information because the tag "knows" that it is requesting configuration by virtue of having, e.g., a button pressed.

In the example of FIG. 3, from the configured state 306 a request for (another) configuration changes the state to reconfigurability validation state 308. In a specific implementation, from the configured state 306, an asset tag can request a configuration update. Requesting an update will normally not require manipulation of, for example, a button on the wireless device, because it may be desirable to enable a wireless tag to automatically update based upon changing protocols or context. It should be noted that although the wireless tag may receive location-agnostic configuration data, the wireless tag may receive the location-agnostic configuration data specifically due to the wireless tag's location. Thus, a location-agnostic wireless device remains location-agnostic even when configurations change due to the location of the wireless tag. As used in this paper, a wireless tag is location-agnostic if data on the wireless tag is insufficient to determine the location of the wireless tag without consulting an asset-tracking system or remote (with respect to the wireless tag) data store. It should be noted that a location-agnostic tag will not even include encrypted data that pinpoints the location of the tag. In another embodiment, the configurability validation parameters and the reconfigurability validation parameters are the same (e.g., the location must be a nurse's station in a hospital to configure or reconfigure a tag). In another implementation, the reconfigurability validation is similar, but different. For example, configurability might be possible in multiple configuration locations, but reconfigurability might only be possible in one of the locations.

If the reconfigurability validation fails, the state returns to the configured state 306. If, on the other hand, the reconfigurability validation succeeds, a new configuration can be pulled and the state returns to the configured state 306. Since it may be desirable to enable automatic configuration updates, a minimalist reconfiguration validation may simply require that the tag be in a configured state to receive configuration updates. In other cases, the updates may be sent only under certain conditions (e.g., when an asset moves to a certain location).

It may be noted that in some implementations, a tag can be unconfigured in some manner. This could be accomplished in several ways. For example, if a tag requests configuration in a valid location, but no asset is ready for association, the tag might become unconfigured. As another example, an administrator could push unconfiguration data to the tag. As another example, a tag could detect detachment from the asset and pull an unconfiguration state (perhaps after reporting telemetry data to help ascertain why the tag was detached). As another example, where a tag is asset-agnostic, every configuration could include instructions for a tag to shut down when detached from an asset (eliminating the need to pull an unconfiguration state from a configuration server).

Figure 4:
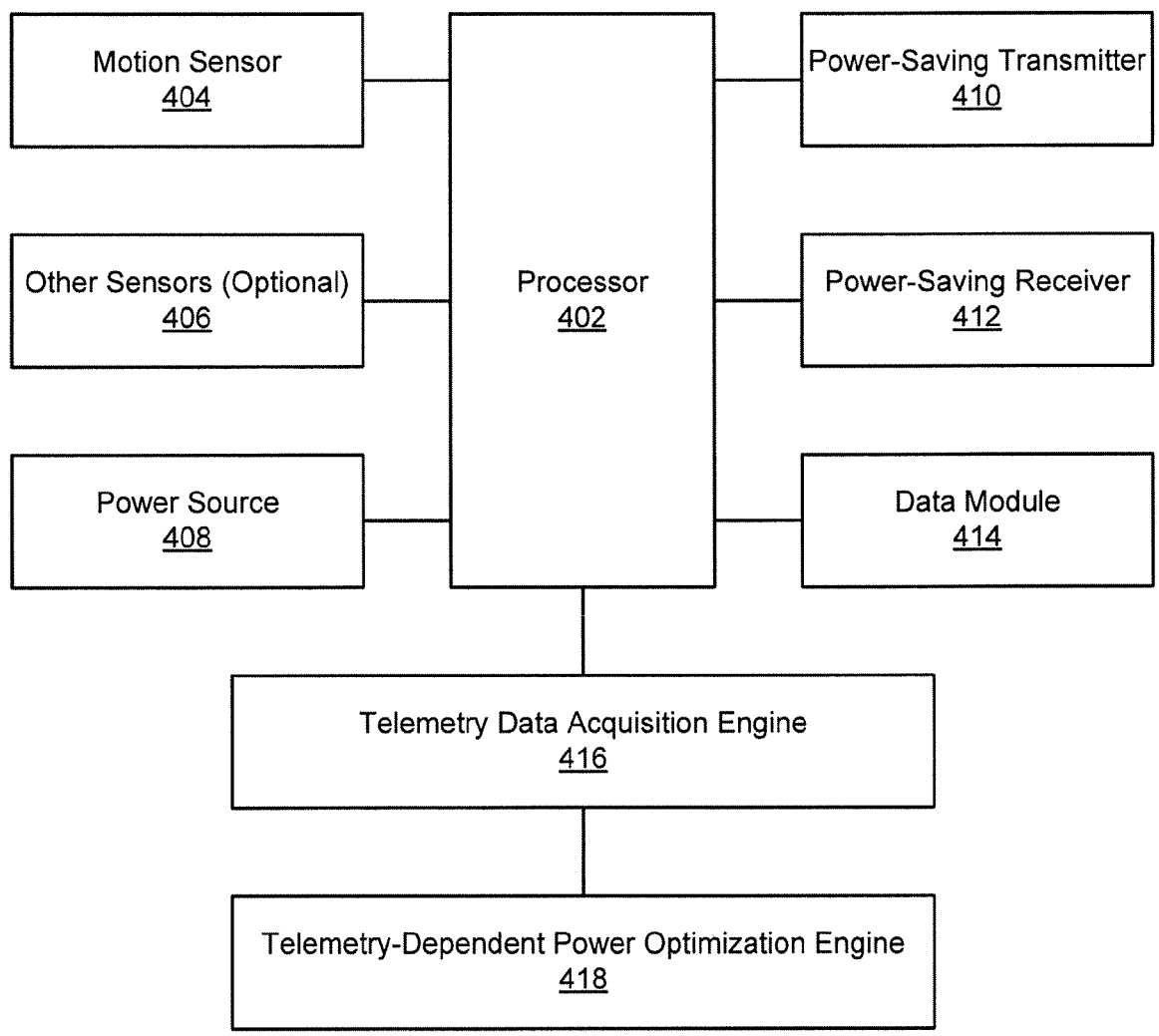
FIG. 4 depicts an example of a power-saving asset tagging device.

FIG. 4 depicts an example of a power-saving asset tagging device 400. The device 400 includes a processor 402, a motion sensor 404, optional other sensors 406, a power source 408, a power-saving transmitter 410, a power-saving receiver 412, a data module 414, a telemetry data acquisition engine 416, and a telemetry-dependent power optimization engine 418. Advantageously, the various techniques described in this paper give the power-saving asset tagging device 400 approximately 2 to 4 times greater lifespan than prior art tags. While maximum power could consume a battery in a matter of days, a reasonable burst (perhaps 10 data points per second) would enable a couple of weeks of operation. Since the burst state is limited in accordance with techniques described in this paper, a lifespan of one or two years is expected for an asset tag under normal conditions, whereas the lifespan of prior art tags is on the order of 6 months.

In the example of FIG. 4, the processor 402 is typically specially configured through firmware or software to perform processing functions for a power-saving asset tag.

In the example of FIG. 4, the motion sensor 404 is coupled to the processor 402. The motion sensor 404 can be implemented as an accelerometer, a ball-in-tube type sensor, or some other applicable known or convenient device that can detect when the device 400 is moved. This is more desirable than, for example, detecting motion around the device 400 because motion around the device 400 does not necessarily result in a need to track the asset to which the tag is, in operation, operationally connected. The motion sensor 404 can provide telemetry data regarding the motion of the device 400. Presumably, when the device 400 does not move, it is unnecessary to track the location of the asset to which the device is operationally connected, which can correspond to a need for lower telemetry reporting requirements and a corresponding decrease in the amount of power the device 400 consumes. Use of the motion sensor 404 can substantially effect the duty cycle of the device 400. For example, when the tag 400 is determined or estimated to be stationary, the tag 400 can operate in an idle state, periodically waking up to transmit one or more packets or frames.

In the example of FIG. 4, the optional other sensors 406 are optional because the motion sensor 404 is all that is the minimally required sensor that will ensure at least some power savings. The optional other sensors 406 can include, by way of example but not limitation, GPS, electromagnetic wave detection, passive RFID, motion, intrusion-detection, temperature, broad spectrum RF, hazard (e.g., radiation-detection), sound, button press, detachment (e.g., magnetic, physical, optical, etc.), or the like. It should be noted that it is possible to implement power-saving optimization using telemetry data even in a system that does not track location. In such an alternative embodiment, the motion sensor 404 could conceivably be treated as optional, and be replaced with some other sensor.

The optional other sensors 406 can include one or more sensors that introduce additional operational states. For example, an asset may be one that should be in a refrigerator. If a temperature sensor determines that the temperature is within an acceptable range (or not above a sensitivity threshold), then the tag 400 might chirp less frequently than it would otherwise chirp while idle, and if the temperature is higher than an acceptable sensitivity threshold, the tag 400 might enter a burst state or an even high power "emergency" state to facilitate as accurate tracking as possible. Temperature can also be encoded as one or more bits in a transmitted frame.

The optional other sensors 406 could include a passive RFID, which is one of the least power-intensive location-estimation systems. If an RFID tag were used, the tag would become a semi-passive RFID for which the RFID could act as a trigger to enter an operational state.

The optional other sensors 406 could include a GPS, though GPS is one of the most power-intensive location-estimation systems. Thus, it would be desirable to use GPS only if the tag could draw on power from the asset (e.g., a car) or if the GPS was only enabled in unusual circumstances (e.g., when following an asset that has been removed from an authorized area).

In the example of FIG. 4, the power source 408 can be an applicable known or convenient power source. In at least one embodiment, the power source 408 includes a battery. However, the power source could include solar components. For human assets, the device 400 could also be "self-winding."

In the example of FIG. 4, the power-saving transmitter 410 can be any applicable known or convenient wireless transmitter. In the example of FIG. 4, the power-saving transmitter 410 includes a radio transmitter. The transmitter is power-saving at least in part because telemetry data captured at least by the motion sensor 404 can be informative regarding when and/or how frequently the transmitter should transmit. In at least one embodiment, a configured tag will transmit an RF signal periodically, which can be used to estimate the location of the device 400 in the presence of a wireless network. Moreover, in an implementation that tracks location, the power-saving transmitter 410 could be configured to send only a MAC address and allow a wireless system to determine location based upon which APs receive the MAC address and, perhaps, the RSSI of the received message. Thus, a location-agnostic tag can be more power efficient than a location-aware tag that attempts to broadcast its known location. Advantageously, since the power-saving transmitter 410 sends only a MAC address in a location-agnostic tag implementation, the transmission power is lower compared to a transmitter that sends a payload. Moreover, the small size of the transmission reduces consumption of wireless bandwidth. In certain situations, it may be desirable to send additional telemetry data, depending upon the implementation and/or embodiment. For example, if temperature increases above an operational threshold, the processor 402 may drive the power-saving transmitter 410 to send temperature-related telemetry data.

In the example of FIG. 4, the power-saving receiver 412 can be any applicable known or convenient wireless transmitter. In the example of FIG. 4 the power-saving receiver 412 includes a radio receiver. The receiver is power-saving at least in part because, in a location-agnostic tag implementation, there is no reason to receive location data, which results in reduced data sent to the tag and a corresponding decrease in power consumption by the power-saving receiver 412. It may be possible to shut down the power-saving receiver 412 except when receiving configuration data, or under only limited circumstances. A missed transmission during one of the periods of transmitter activity is unlikely to have a significant impact on the system; so it is not necessarily desirable to receive acknowledgement after sending a packet or frame. Thus, in an embodiment, a one-way protocol is used.

It should be noted that the power-saving transmitter 410 and the power-saving receiver 412 can be used to communicate with other tags. However, communication with other tags and/or forming a tag mesh network will have power consumption implications. Also, the power-saving transmitter 410 and the power-saving receiver 412 can operate in frequencies that have licensed band implications, depending upon whether the frequency is within a licensed band. Due at least in part to the constraints, WiFi is considered to be a good operational band, and has the advantage of being implemented already, reducing or eliminating the need to install additional location-detecting or other infrastructure.

In the example of FIG. 4, the data module 414 can include, for example, configuration data. Depending upon the implementation and/or embodiment, other data can also be stored, such as telemetry data. Since configuration data should be stored in a non-volatile location, at least a portion of the data module 414 will typically include non-volatile storage. In some implementations, telemetry data or a telemetry history is non-volatile, as well, and could be stored in the data module 414. In other implementations, telemetry data might be discarded after comparing against a threshold or after transmitting the telemetry data. Nevertheless, is no absolute reason for the data module 414 to include only non-volatile or partially non-volatile storage; the data module 414 could conceivably include volatile storage.

In the example of FIG. 4, the telemetry data acquisition engine 416 obtains telemetry data from the motion sensor 404 and the optional other sensors 406. Using the telemetry data, the telemetry-dependent power optimization engine 418 can set power-saving components to appropriate power consumption levels.

Figure 5:
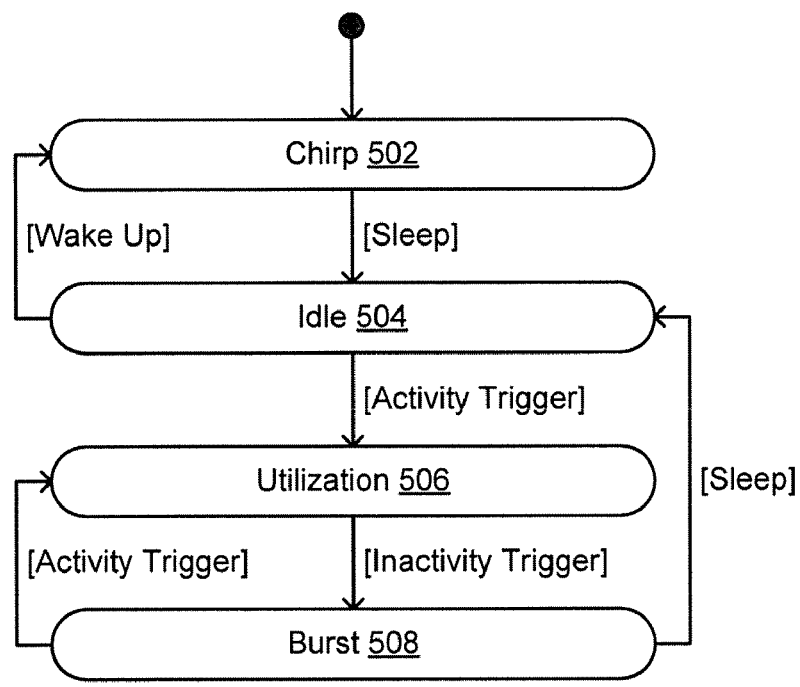
FIG. 5 depicts an example of a state diagram for a power-saving asset tag in operation.

FIG. 5 depicts an example of a state diagram 500 for a power-saving asset tag in operation. In the example of FIG. 5, the state diagram 500 starts at chirp state 502. Initially, the chirp state could be initiated immediately upon configuration of the tag (the tag could also start in some other state, and chirp is simply chosen as a representative embodiment). At chirp state 502, the tag can pull configuration data, transmit a frame to enable an asset tracking system to see that the tag is still active and perhaps to update location, and/or send routine telemetry data. It should be noted that the chirp state 502 is intended to be short and conserve power; the chirp state 502 is a low power state because of the limited transmissions. So it may be desirable simply to send a single frame with no payload. If updating configuration data periodically is desirable, it may also be desirable to pull configuration data if necessary, without sending any telemetry data.

In the example of FIG. 5, after the chirp state 502 has continued for a short time (e.g., the tag sent one frame and/or pulled appropriate configuration data) the tag transitions to an idle state 504. Upon entry into the idle state 504, some form of a clock/timer, counter, or other wakeup alarm can be set, which is referred to in this example as a chirp alarm. The chirp alarm can be implemented using an applicable known or convenient technology that makes it possible for a tag to wake up from time to time. When a measured value reaches a threshold associated with the chirp alarm, the tag can wake up, and the state diagram 500 transitions back to the chirp state 502.

In the idle state 504, the tag continuously acquires telemetry data using at least one sensor, such as a motion sensor or a temperature sensor. In an embodiment, it is possible that telemetry data acquired by one or more of the sensors is stored until transitioning back to the chirp state 502 when the tag wakes up, and then pushed upstream. However, in at least one embodiment, an activity trigger is engaged when the telemetry data indicates a static context threshold may have been exceeded. For example, a motion sensor can have an associated sensitivity threshold. While a telemetry data value from the motion sensor does not exceed the sensitivity threshold, the tag may continue in the idle state 504. However, if a telemetry data value from the motion sensor exceeds the sensitivity threshold, the state diagram 500 may transition to a low power state. It should be noted that telemetry data comes from sensors that may or may not be accurate (errors are possible). An activity trigger might engage only after a telemetry data value exceeds a sensitivity threshold for a period of time. This can reduce errors and/or prevent unnecessary activation of the tag.

In the example of FIG. 5, after an activity trigger is engaged, the state diagram 500 transitions to the utilization state 506. The state is called a "utilization" state because in the case of a motion sensor activity trigger, the tag is at least being jostled and may be transported or actively used. In each case, the assumption, until data indicates otherwise, is that the asset to which the tag is operationally connected is being utilized. Perhaps counter-intuitively, activity does not automatically trigger entry into a high power state. In the case of a motion activity trigger, for example, an asset could be moved around for a relatively long time before coming to rest again. If the tag is in a high power state then the tag might consume power too quickly, as well as consume wireless resources unnecessarily. Moreover, if the asset is moving then it is more likely that someone knows where it is; so it may not be as important to get constant context updates.

The amount of telemetry data that is uploaded in the utilization state 506 is implementation and/or configuration-dependent, and the utilization state 506 can be associated with more or less power consumption than the chirp state 502, which is also a "low power state." In some implementations, the utilization state 506 is associated with a different set of upload and/or download parameters than in the chirp state 502. For example, a tag in the utilization state 506 may receive instructions to act differently when it is taken from one location to another location (e.g., a tag operationally connected to an asset might be silent when in an acceptable location, begin blinking when approaching an unacceptable location, and set off an alarm when outside of an acceptable location), but would not need to receive such instructions when in the chirp state 502.

The utilization state 506 will, of course, be associated with more power consumption than the idle state 504. In a typical implementation, the utilization state 506 will also be associated with more power consumption than the idle (with periodic chirp) state 504. In addition, in an embodiment, the tag will encode one or more bits in a frame sent during the utilization state 506 to indicate that the tag is in motion. The tag may preserve the amount of time a tag is in the utilization state 506 for, for example, use in other states.

In general, it is more likely that countermeasures would be implemented while in the utilization state 506 (e.g., locking brakes when a cart is pushed outside of an authorized location) than in some other state. Similarly, it is more likely that new functionality would be desirable while in the utilization state 506 (e.g., providing exhibition data to a guest that is near the associated exhibit).

In the example of FIG. 5, at some point a telemetry data value drops below the sensitivity threshold again, an inactivity trigger is engaged and the state diagram 500 transitions to a burst state 508. In the burst state 508, context can be sent in a burst to help an asset tracking system to accurately estimate the location and/or status of the asset. The burst state is the only high power state depicted in the state diagram 500. The duration of the burst state 508 depends upon implementation, configuration, and/or environmental factors. The goal of the burst state 508 is to provide as much data as is will enable the asset tracking system to adequately determine location and/or state, without providing redundant data. If a telemetry data value reaches the sensitivity threshold during the burst state 508, the state diagram 500 transitions back to the (low power) utilization state 506. However, if the burst state 508 is able to run its course (as determined by a number of frames sent, a timer, or some other mechanism) then the state diagram 500 transitions back to the idle state 504. The amount of time spent in the burst state 508 can be either statically or dynamically determined. For example, it may be desirable to take into environmental (such as current estimated battery life) or historical data (such as the amount of time spent in the utilization state 506 prior to entering the burst state 508).

Since the burst state 508 is associated with the highest power consumption of any of the states, it is desirable to remain in the burst state 508 for as short as is practical. However, in at least some embodiments, it will still be desirable to transmit redundant data. Redundant data can be advantageous because 1) an asset tracking system can weight, for example, RSSI measurements higher in determination of a new location, and apply logic such that the system can rapidly determine the new location of the device now that it has stopped moving; 2) provide higher probability that frames will be received without error in the presence of noise or overlapping transmission; 3) provide a larger body of sampled values for statistical pattern matching, reducing the amount of error a single frame can introduce.

Figure 6:
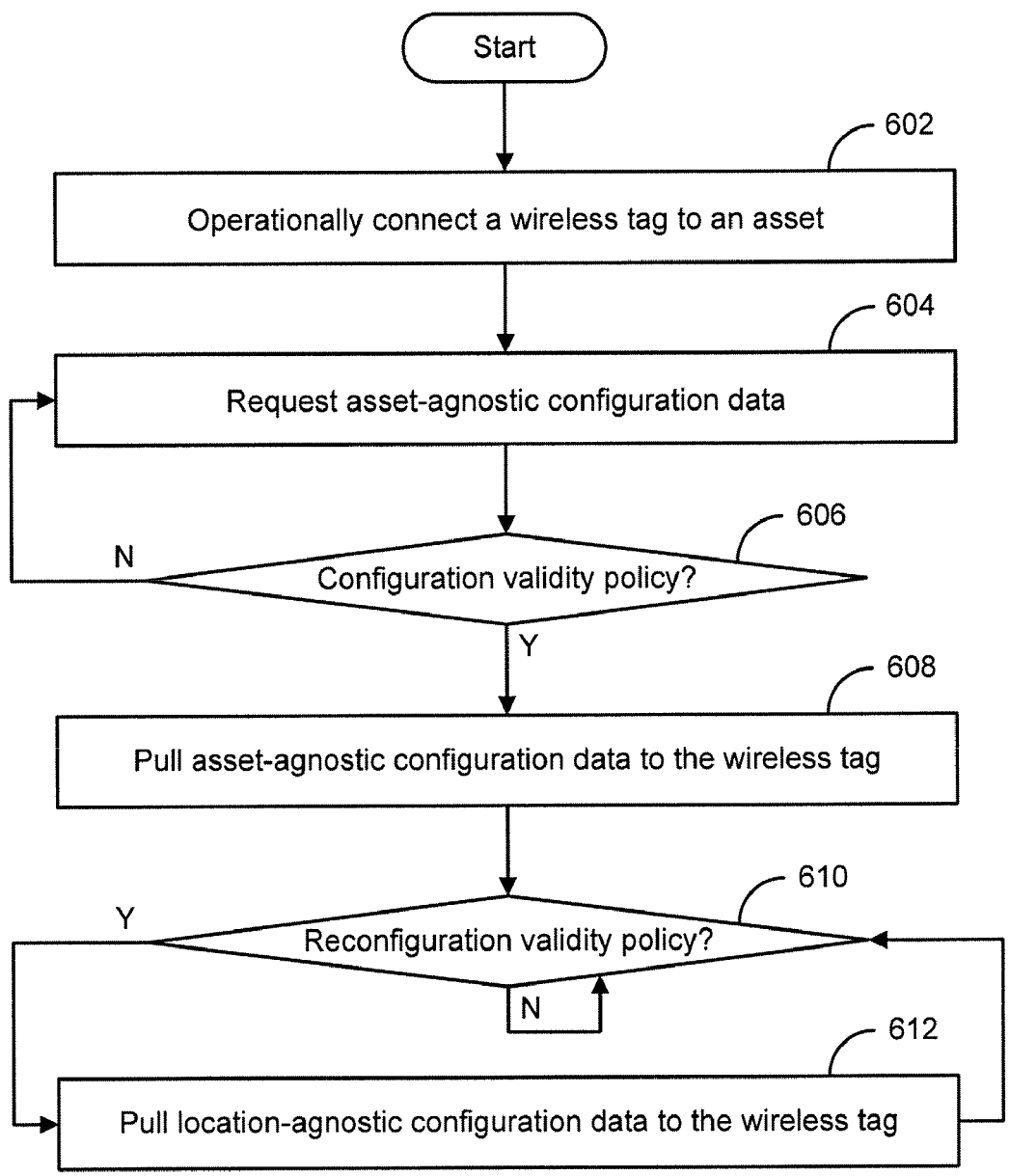
FIG. 6 depicts a flowchart of an example of a method for configuration an asset-agnostic, location-agnostic wireless tag.

FIG. 6 depicts a flowchart 600 of an example of a method for configuration an asset-agnostic, location-agnostic wireless tag. The flowchart 600 is organized as a sequence of modules. However, it should be understood that these and other modules associated with other methods described herein may be reordered for parallel execution or into different sequences of modules.

In the example of FIG. 6, the flowchart 600 starts at module 602 with operationally connecting a wireless tag to an asset. It may be desirable to include a connection sensor that reduces or eliminates the possibility that a tag can be associated with an asset to which it is not operationally connected. Thus, an embodiment may require operationally connecting the wireless tag to the asset before the wireless tag can be configured, and may trigger an unconnected state if the tag is later removed, the repercussions of which would be implementation-specific (e.g., the tag could immediately become unconfigured, the tag could maintain its configuration if reconnected within a certain period of time, the tag could enter an "emergency" burst state designed to enable rapid location of the place at which the tag was disconnected from the asset, etc.)

In the example of FIG. 6, the flowchart 600 continues to module 604 with requesting asset-agnostic configuration data. It may be desirable for a tag to have no data associated with an asset. This enables the tag to operate with less data storage and, if the data were to be provided over the air, reduces consumption of power and wireless resources. Also, when a tag is removed from an asset, data associated with the asset cannot be extracted from the tag, though historical data could still be maintained in a secure location if asset tracking reports were desired by those with adequate security access. It should be noted that a domain logic engine may very well know about the asset, and provide configuration data depending upon the type of asset or using other asset-related data.

In the example of FIG. 6, the flowchart 600 continues to decision point 606 where it is determined whether a configuration validity policy is met. The configuration validity policy might be as simple as flagging at a domain logic engine an asset for association with a wireless tag, then pressing a button on the wireless tag (the wireless tag would then be assumed to be requesting the asset-agnostic configuration data associated with the flagged asset). Alternatively, the wireless tag and the asset might have a barcode that is scanned in the same approximate time frame, causing an association thereby. The configuration validity policy may also have a location-based requirement, such as requiring configuration to occur in an administrator's office or a nurse's station.

If it is determined that the configuration validity policy is not met (606-N), then the flowchart 600 returns to module 604 and continues from there. It is possible that the configuration validity policy would not ever be met for a particular attempted configuration (and the flowchart 600 would end), though the flowchart 600 assumes for illustrative purposes that the configuration eventually occurs (606-Y).

When it is determined that the configuration validity policy is met (606-Y), the flowchart 600 continues to module 608 where asset-agnostic configuration data is pulled to the wireless tag. It is expected that a wireless tag will pull data because the wireless tag is typically the device being manipulated and therefore knows when is the best time to attempt configuration by requesting configuration data from a configuration server. On the other hand, it would not be impossible to design a system in which the wireless tag waits for a configuration server to push configuration data to it.

In the example of FIG. 6, the flowchart 600 continues to decision point 610 where it is determined whether a reconfiguration validity policy is met. In an embodiment, the reconfiguration validity policy is less stringent than the configuration validity policy (606). Since the wireless tag is already configured (608), an asset tracking system is already aware of an association between the wireless tag and an asset; so the risk of mistake is low. Moreover, it might be desirable to enable configuration updates at any time, based upon changing policies or environmental factors such as a change in location. In one implementation, the only reconfiguration validity requirement is that the wireless tag still be operationally connected to the asset.

If it is determined that the reconfiguration validity policy is not met (610-N), then the flowchart loops back to decision point 610 until such time as the reconfiguration validity policy is met. This could mean that a wireless tag is not updated, which may or may not be a desirable outcome. Also, it may be that a wireless tag becomes disconnected from the asset and, when detected, is no longer treated as configured, in which case the flowchart 600 would end. However, the flowchart 600 assumes for illustrative purposes that the reconfiguration validity policy is eventually met.

When the reconfiguration validity policy is met (610-Y), the flowchart 600 continues to module 612 where location-agnostic configuration is pulled to the wireless tag. It should be noted that an asset-tracking system may make a determination that certain configuration data is desirable due to the location of the wireless tag, but the wireless tag itself can remain location-agnostic.

Figure 7:
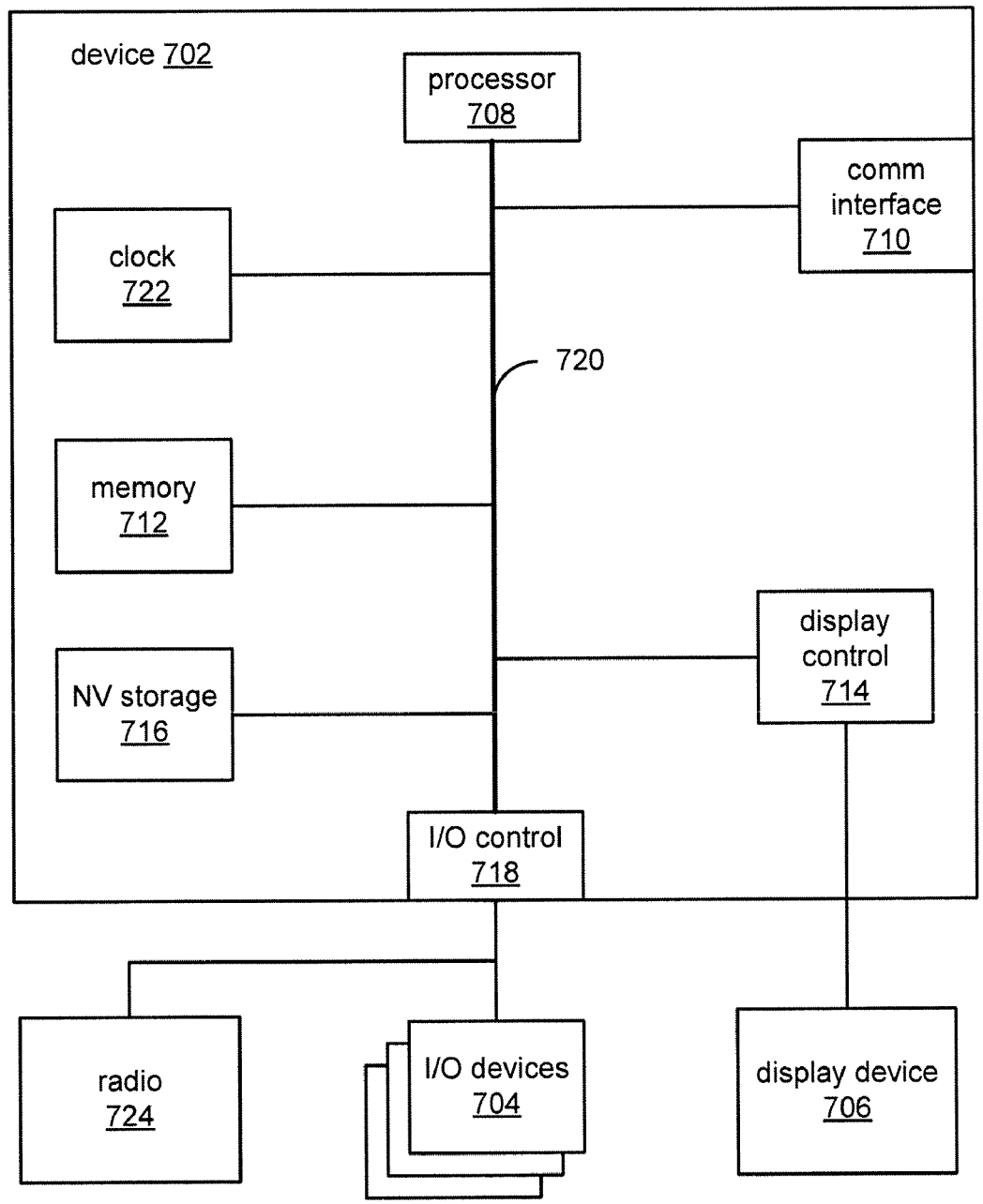
FIG. 7 depicts an example of a computing system that is reasonably representative of the computing systems discussed in this paper.

FIG. 7 depicts an example of a computing system 700 that is reasonably representative of the computing systems discussed in this paper. The system 700 can be used as a client computer system, such as a wireless client or a workstation, or a server computer system. The system 700 includes a device 702, I/O devices 704, and a display device 706. The device 702 includes a processor 708, a communications interface 710, memory 712, display controller 714, non-volatile storage 716, I/O controller 718, clock 722, and radio 724. The device 702 may be coupled to or include the I/O devices 704 and the display device 706.

The device 702 interfaces to external systems through the communications interface 710, which may include a modem or network interface. It will be appreciated that the communications interface 710 can be considered to be part of the system 700 or a part of the device 702. The communications interface 710 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 708 may be, for example, a conventional microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 708 to the memory 712, also to the non-volatile storage 716, to the display controller 714, and to the I/O controller 718.

The I/O devices 704 can include a keyboard, disk drives, printers, a scanner, and other input and output devices, including a mouse or other pointing device. The display controller 714 may control in the conventional manner a display on the display device 706, which can be, for example, a cathode ray tube (CRT) or liquid crystal display (LCD). The display controller 714 and the I/O controller 718 can be implemented with conventional well known technology.

The non-volatile storage 716 is often a magnetic hard disk, flash memory, an optical disk, or another form of storage for large amounts of data. Some of this data is often written, by a direct memory access process, into memory 712 during execution of software in the device 702. One of skill in the art will immediately recognize that the terms "machine-readable medium" or "computer-readable medium" includes any type of storage device that is accessible by the processor 708.

Clock 722 can be any kind of oscillating circuit creating an electrical signal with a precise frequency. In a non-limiting example, clock 722 could be a crystal oscillator using the mechanical resonance of vibrating crystal to generate the electrical signal.

The radio 724 can include any combination of electronic components, for example, transistors, resistors and capacitors. The radio is operable to transmit and/or receive signals.

The system 700 is one example of many possible computer systems which have different architectures. For example, personal computers based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 712 for execution by the processor 708. A Web TV system, which is known in the art, is also considered to be a computer system, but it may lack some of the features shown in FIG. 7, such as certain input or output devices. A typical computer system will usually include at least a processor, memory, and a bus coupling the memory to the processor.

In addition, the system 700 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 716 and causes the processor 708 to execute the various acts required by the operating system to input and output data and to store data in memory, including storing files on the non-volatile storage 716.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of these teachings.

What is claimed is:

1. A method, comprising:
   receiving a pull request from a wireless tag for asset-agnostic configuration data such that the wireless tag is evaluated with respect to a configuration validity policy, the wireless tag configured to be operationally associated with an asset; and
   when the wireless tag is acting in accordance with a configuration validity policy, sending the asset-agnostic configuration data to the wireless tag in response to the pull request, the configuration validity policy including an asset-tag association requirement.

2. The method of claim 1, wherein when the wireless tag is violating the configuration validity policy, the method further comprising: not pulling the asset-agnostic configuration data from a configuration server.

3. The method of claim 1, further comprising: maintaining asset-agnostic configuration data associated with the asset.

4. The method of claim 1, further comprising: maintaining location-agnostic configuration data associated with a location of the wireless tag.

5. The method of claim 1, further comprising: operationally connecting the asset-agnostic wireless tag to the asset.

6. An apparatus, comprising:
   a telemetry-dependent power optimization engine configured to be coupled to a processor that pulls asset-agnostic configuration data to the wireless tag based on a configuration validity policy, the configuration validity policy including an asset-tag association requirement,
   the telemetry-dependent power optimization engine configured to set a power-saving transmitter to a state based on telemetry data and the asset-agnostic configuration data, the state including all of, but at different times, a chirp state, an idle state, a utilization state, and a burst state, the utilization state being associated with a power consumption lower than a power consumption associated with the burst state.

7. The apparatus of claim 6, wherein the telemetry-dependent power optimization engine is configured to be coupled to a power source.

8. The apparatus of claim 6, wherein the telemetry-dependent power optimization engine is configured to be coupled to a telemetry data acquisition engine that obtains telemetry data from a sensor.

9. The apparatus of claim 6, wherein the telemetry-dependent power optimization engine is configured to set a power-saving receiver to a state based on the telemetry data.

10. The apparatus of claim 6, wherein the telemetry-dependent power optimization engine is configured to be coupled to a data module storing asset-agnostic configuration data during operation.

11. The apparatus of claim 6, wherein the telemetry-dependent power optimization engine is configured to be coupled to a data module storing location-agnostic configuration data during operation.

12. The apparatus of claim 6, wherein the telemetry-dependent power optimization engine is configured to set the power transmitter such that the power-saving transmitter sends at least one frame that includes a MAC address when in the chirp state,
   telemetry-dependent power optimization engine is configured to set the power transmitter such that the power-saving transmitter changes the idle state from the chirp state after the power-saving transmitter has sent the at least one frame.

13. The apparatus of claim 6, wherein the telemetry-dependent power optimization engine is configured to transition the power-saving transmitter from the idle state to the utilization state when a telemetry data value associated with a motion sensor exceeds a sensitivity threshold.

14. The apparatus of claim 6, wherein the telemetry-dependent power optimization engine is configured to transition the power-saving transmitter from the utilization state to the burst state when a telemetry data value associated with a motion sensor falls below a sensitivity threshold.

15. The apparatus of claim 6, wherein the telemetry-dependent power optimization engine is configured to transition the power-saving transmitter from the burst state to the idle state after a period of time.

16. The apparatus of claim 6, wherein the telemetry-dependent power optimization engine is configured to transition the power-saving transmitter from the burst state to the utilization state when a telemetry data value associated with a motion sensor exceeds a sensitivity threshold.

17. A method, comprising:
sending from a wireless tag a pull request for asset-agnostic configuration data such that the wireless tag is evaluated with respect to a configuration validity policy, the wireless tag configured to be operationally associated with an asset; and
when the wireless tag is acting in accordance with a configuration validity policy, receiving at the wireless tag the asset-agnostic configuration data, the configuration validity policy including an asset-tag association requirement.

18. The method of claim 17, further comprising entering a configurability validation state in response to sending the request.

19. The method of claim 17, further comprising entering a configured state in response to pulling the asset-agnostic configuration data.

20. The method of claim 19, further comprising:
sending from the wireless tag a request for a location-agnostic configuration data update; and
when the wireless tag is acting in accordance with a reconfiguration validity policy, pulling location-agnostic configuration data, the reconfiguration validity policy different than the configuration validity policy.

* * * * *